United States Patent
Church, IV et al.

(10) Patent No.: US 11,327,809 B2
(45) Date of Patent: May 10, 2022

(54) VIRTUAL MACHINE MEMORY REMOVAL INCREMENT SELECTION

(71) Applicant: International Business Machines Corporation, Armonk, NY (US)

(72) Inventors: Walter Church, IV, Binghamton, NY (US); Ronald C. Pierson, Green Cove Springs, FL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 446 days.

(21) Appl. No.: 16/445,281

(22) Filed: Jun. 19, 2019

(65) Prior Publication Data
US 2020/0401455 A1  Dec. 24, 2020

(51) Int. Cl.
*G06F 9/455* (2018.01)
*G06F 9/50* (2006.01)
*G06F 3/06* (2006.01)

(52) U.S. Cl.
CPC .......... *G06F 9/5077* (2013.01); *G06F 3/0608* (2013.01); *G06F 3/0652* (2013.01); *G06F 3/0659* (2013.01); *G06F 3/0664* (2013.01); *G06F 3/0673* (2013.01); *G06F 9/45558* (2013.01); *G06F 2009/45583* (2013.01); *G06F 2209/5011* (2013.01)

(58) Field of Classification Search
CPC .... G06F 9/5077; G06F 3/0608; G06F 3/0652; G06F 3/0659; G06F 3/0664; G06F 3/0673; G06F 9/45558
See application file for complete search history.

(56) References Cited

U.S. PATENT DOCUMENTS

| 7,787,305 | B2 | 8/2010 | Kim et al. |
| 8,788,778 | B1* | 7/2014 | Boyle ................... G06F 3/0674 |
| | | | 711/165 |
| 9,262,332 | B2 | 2/2016 | Declercq et al. |
| 9,395,924 | B2 | 7/2016 | Cohen et al. |
| 9,423,970 | B2 | 8/2016 | Darragh |
| 9,529,632 | B2 | 12/2016 | Mantor et al. |

(Continued)

OTHER PUBLICATIONS

Balmau et al.; "Fast And Robust Memory Reclamation For Concurrent Data Structures", SPAA'16 28th ACM Symposium On, pp. 349-359, Jul. 11-13, 2016.

(Continued)

*Primary Examiner* — Tammy E Lee
(74) *Attorney, Agent, or Firm* — Cantor Colburn LLP; Edward Wixted

(57) ABSTRACT

An aspect of the invention includes a method for receiving a request to reclaim a portion of a memory assigned to a virtual machine (VM). In response to receiving the request, an increment of the plurality of increments to vacate is selected. The selecting is based at least in part on the failure counts corresponding to each of the plurality of increments. An attempt is made to vacate all contents of the selected increment. Based at least in part on determining that all contents of the selected increment were not vacated, a failure count corresponding to the selected increment is incremented. Based at least in part on determining that all contents of the selected increment were vacated, an assignment of the selected increment to the VM is removed.

20 Claims, 7 Drawing Sheets

(56) References Cited

U.S. PATENT DOCUMENTS

| | | |
|---|---|---|
| 10,185,384 B2 | 1/2019 | Sharda et al. |
| 2005/0257020 A1 | 11/2005 | Kashyap et al. |
| 2007/0033325 A1 | 2/2007 | Sinclair |
| 2016/0253101 A1 | 9/2016 | Ipek et al. |
| 2016/0267005 A1 | 9/2016 | Natarajan et al. |
| 2016/0335144 A1 | 11/2016 | Cai et al. |
| 2018/0307600 A1 | 10/2018 | Wang et al. |
| 2019/0034095 A1* | 1/2019 | Singh ............... G06F 12/0253 |
| 2019/0108123 A1 | 4/2019 | Anghel et al. |
| 2020/0089894 A1* | 3/2020 | Liu ..................... G06F 3/0631 |

OTHER PUBLICATIONS

Cohen, Nachshon; "Every Data Structure Deserves Lock-Free Memory Reclamation", ACM On programming Languages, vol. 2, Article No. 143, pp. 1-25, Nov. 2018.

Poter et al.; "A New And Five Older Concurrent Memory Reclamation Schemes In Comparison (Stamp-It)", Cornell University Library, arXiv:1712.06134v1, pp. 1-3, Dec. 17, 2017.

Wen et al.; "Interval-Based Memory Reclamation", PPoPP'18 23rd ACM SIGPLAN Symposium On, pp. 1-13, Feb. 24-28, 2018.

* cited by examiner

VIRTUAL MACHINE MEMORY REMOVAL INCREMENT SELECTION

BACKGROUND

The present invention generally relates to virtual machines (VMs), and more specifically, to VM memory removal increment selection.

Many computer systems provide for partitioning. Partitioning, which is most typically implemented in server systems, divides the available system resources into logically partitioned groups. In particular, memory devices, processors, and input/output (I/O) devices are logically partitioned into independent, secure groups of resources. An independent operating system (OS) image typically runs on each partition, or VM, allowing for multiple OSs to concurrently execute on a computer system, and allowing each VM to function independently of other VMs executing on the computer system.

SUMMARY

According to one or more embodiments of the present invention a non-limiting example computer-implemented method includes receiving a request to reclaim a portion of a memory assigned to a virtual machine (VM). The memory is divided into a plurality of increments and each increment has a corresponding failure count that indicates a number of failures associated with any previous attempts to vacate the increment. In response to receiving the request, an increment of the plurality of increments to vacate is selected. The selecting is based at least in part on the failure counts corresponding to each of the plurality of increments. An attempt is made to vacate all contents of the selected increment. Based at least in part on determining that all contents of the selected increment were not vacated, a failure count corresponding to the selected increment is incremented. Based at least in part on determining that all contents of the selected increment were vacated, an assignment of the selected increment to the VM is removed.

Other embodiments of the present invention implement the features of the above-described methods in computer systems and in computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
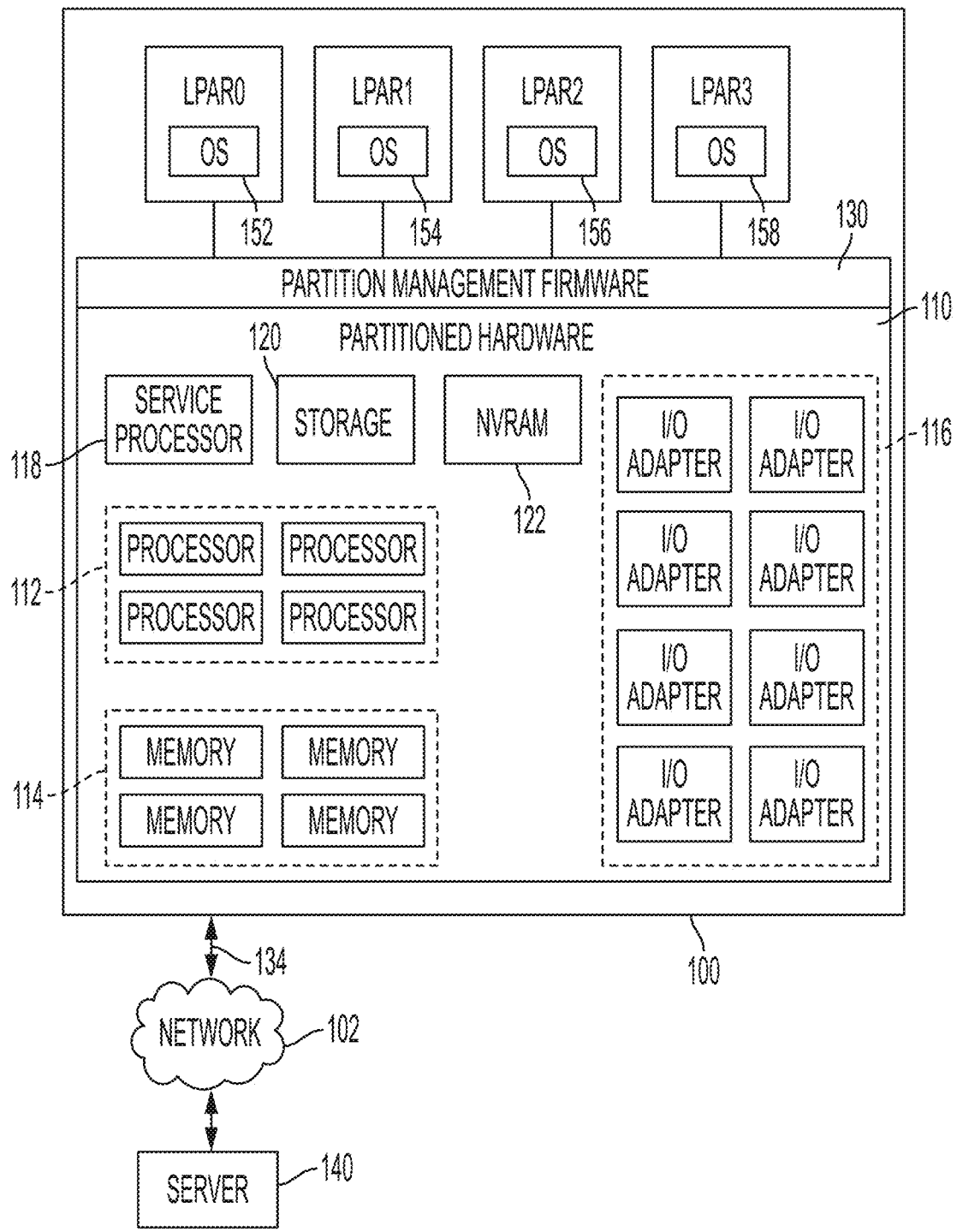
FIG. 1 is a block diagram of a logically partitioned data processing system in accordance with one or more embodiments of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three-digit reference numbers. With minor exceptions, the leftmost digit(s) of each reference number correspond to the figure in which its element is first illustrated.

DETAILED DESCRIPTION

One or more embodiments of the present invention select a memory increment to vacate during memory reclamation of memory used by a virtual machine (VM), or logical partition (LPAR). The selection can be based on criteria such as, but not limited to: whether contents of a memory increment can be vacated; and an amount of free space in the memory increment. In one or more embodiments of the present invention, the selection is performed by a partition manager, such as a hypervisor.

One or more embodiments of the present invention provide dynamic storage reconfiguration (DSR) which is the ability of a partition manager to increase or decrease the amount of memory utilized by an executing VM. Storage must be added or removed from the VMs in multiples of the storage increment size. Each increment of storage contains multiple frames of memory, with each frame storing a page of memory. In accordance with one or more embodiments each page is four kilobytes (4K) in size and each storage increment is two gigabytes (2 GB) in size. One skilled in the art will recognize that other sizes of pages and storage increments (also referred to herein as memory increments) can be implemented by one or more embodiments of the present invention. The storage increment size is typically fixed and determined by the hardware. As used herein, the terms "memory reclamation" or "reclaiming memory" refers to the process of removing some storage (in units of increments) from one VM and putting it back into standby storage where it can be used by another VM. The terms "VM" and "LPAR" are used interchangeably herein to refer to a logical partition being managed by a partition manager.

In accordance with one or more embodiments of the present invention, a portion of the memory allocated to a VM is permanent VM storage, that is, storage that cannot be removed from the VM by memory reclamation. The permanent storage can be used, for example, for processor control structures and pages that might be locked long term. One or more embodiments of the present invention allow the permanent VM storage to be supplemented with reconfigurable storage that can be added and removed by memory reclamation. Reconfigurable storage can be used by a VM, for situations such as, but not limited to: extra workload that happens during special events or at certain times; workload that does not always run on the VM; and workload that is growing and might need its own VM in the future. One or more embodiments of the present invention can be utilized in environments where memory is categorized as permanent storage and reconfigurable storage. One or more embodiments of the present invention can also be utilized in environments where the data is not categorized in this manner.

As known in the art, a partition manager, such as a hypervisor, is implemented by computer software, firmware, and/or hardware and can create and run VMs. A hypervisor is typically allocated an amount of real memory (also referred to herein as "storage") available for allocation to the VMs. At least a portion of the memory (e.g., the reconfigurable memory increments) can be added and removed from each VM dynamically while the system is running. Before the memory can be removed from a VM, its contents must be moved elsewhere, either to other memory increments and/or to paging disks. This process of moving the contents of a memory increment from one storage location to another is referred to herein as "vacating memory." After the memory is vacated, the hypervisor can remove the memory from the VM and return it to a pool of storage that is available for other uses (e.g., reconfigurable storage). As described previously, in contemporary systems the removal of the memory, or memory reclamation, must be performed on set memory sizes, referred to herein as an "increment sizes." An example of a contemporary system that currently requires removal of memory in set memory increment sizes includes, but is not limited to IBM Z®, where the increment size is a function of the hardware level and logical partition (LPAR) memory size.

In accordance with one or more embodiments of the present invention, the memory, which must be returned, or reclaimed, in units of memory increments is vacated in memory increments. However, some memory increments may store more data than others and therefore may not be the best candidate for removal. Selecting the best memory increments for reclamation can be important for system performance. Selecting a poor choice memory increment could result in the vacating process taking longer to remove all the contents and potentially getting stuck if some contents in memory cannot be moved.

Current implementations for memory removal start at the highest memory address and work down removing memory increments. If a memory increment cannot be removed, then the reclamation fails and no more increments can be processed below. Reclamations performed today also do not attempt to determine which increments may be the most suitable for reclaiming because they work from a "top-down" approach and do not handle creating "holes" in memory.

In accordance with one or more embodiments of the present invention, an issuer of a memory reclamation command, such as a system operator or system administrator, specifies how much memory should be reclaimed from the VM, and the processing described herein handles determining which memory increments should be removed to reclaim the specified amount of memory. In accordance with one or more embodiments of the present invention, the memory increments which have the least numbers of failures and the most frames not currently storing valid data are selected to be vacated. Taking these factors, or criteria, into consideration can increase the performance and success of the reclamation.

In accordance with one or more embodiments of the present invention, when memory reclamation is initiated, the selection process described herein determines which memory increment(s) from the reconfigurable storage is the best candidate(s) for removal. This selection can be made by finding the memory increment that has the least number of failures. A failure happens when the contents of the memory increment cannot be vacated either permanently or temporarily such as, but not limited to: pages locked long term, pages of types prohibited from being moved, and timeout while attempting to move a page. During the reclamation process, failure counts are updated (e.g., incremented) for memory increments that are found to have contents that are stuck and cannot be moved. Those memory increments will then have a lower priority for selection by the selecting process described herein. If multiple memory increments have the same minimum number of failures, then the memory increment with the most frames available is chosen. Selecting the memory increment with the most frames available provides memory increments that have the least amount of data that will have to be moved across memory. If multiple memory increments have the same number of available frames then the first memory increment found can be selected. In accordance with one or more embodiments of the present invention, the memory increments are searched through the available zone list. The available zone list is a structure that contains information about the increments. Every increment may have one or more available zones that detail information about the increment and its usage. The number of failures and amount of free space are examples of two criteria that can be used to select a memory increment to vacate. Other criteria can also be used such as, but not limited to: most recently added increment, and lowest number of pinned pages.

Turning now to FIG. 1, a block diagram of a logically partitioned data processing system is generally shown in accordance with one or more embodiments of the present invention. Data processing system 100 includes partitioned hardware 110. Partitioned hardware 110 includes the hardware components of data processing system 100 that can be allocated into LPARs and managed by partition management firmware 130 (e.g., a hypervisor). For purposes of example, data processing system 100 is described with reference to the partitioned hardware, rather than a schematic showing how components of the hardware are interconnected. It will be understood, however, that the hardware components within partitioned hardware 110 of data processing system 100 are connected by multiple buses or other communication devices for communicating information within data processing system 100. The buses, for example, may include low-latency and higher latency paths connected by bridges and adapters and controlled by multiple controllers (not depicted). Further, it will be understood that in addition to the components illustrated in data processing system 100, additional components may be implemented within data processing system 100.

Within partitioned hardware 110, multiple hardware components include processors 112, memory units 114, storage 120, and I/O adapters 116. Processors 112 may be general-purpose processors, such as, but not limited to, IBM's PowerPC™ or IBM Z® processors that, during normal operation, process data under the control of operating system (OS) and application software accessible from a dynamic storage device such as random access memory (RAM) and a static storage device such as read only memory (ROM) built-in with each processor. In addition, memory units 114 may include multiple types of volatile and non-volatile memory which are partitioned and accessible to the processors 112.

In one example, memory units 114 may include on-demand memory that is activated and allocated only when needed by data processing system 100. In addition, in one example, on-demand memory from other server systems via a network such as network 102 or cloud may be made available to the LPARs of FIG. 1.

In the embodiment shown in FIG. 1, data processing system 100 includes four logical partitions (LPARs), where each LPAR, or VM, includes a portion of available processors 112, I/O adapters 116, and memory units 114. A separate OS instance executes within each LPAR. For example, OS 152 operates in LPAR0, OS 154 operates in LPAR1. OS 156 operates in LPAR 2, and OS 158 operates in LPAR3. It will be understood that while data processing system 100 is defined to include four LPARs, resources are not automatically allocated for four LPARs. Further, it will be understood that any number of LPARs may be defined for a data processing system depending on the amount of resources available in the data processing system and the minimum required resource allocation for an LPAR. In particular, configurable determinations can be made for different partition implementations.

In one example of the implementation of a partition management layer. NVRAM 122 may store a table identifying resource allocation among the LPARs. Partition management firmware 130, executing on service processor 118, accesses the table from NVRAM to provide for memory mapping and other partition security measures.

In accordance with one or more embodiments of the present invention, computer instructions to execute the selection, vacating, and reclamation processes are located in the partition management firmware 130. It will be understood that partition management firmware 130 may be implemented using a hypervisor or other middleware enabled to allocate and control partitions within a data processing system.

Figure 4:
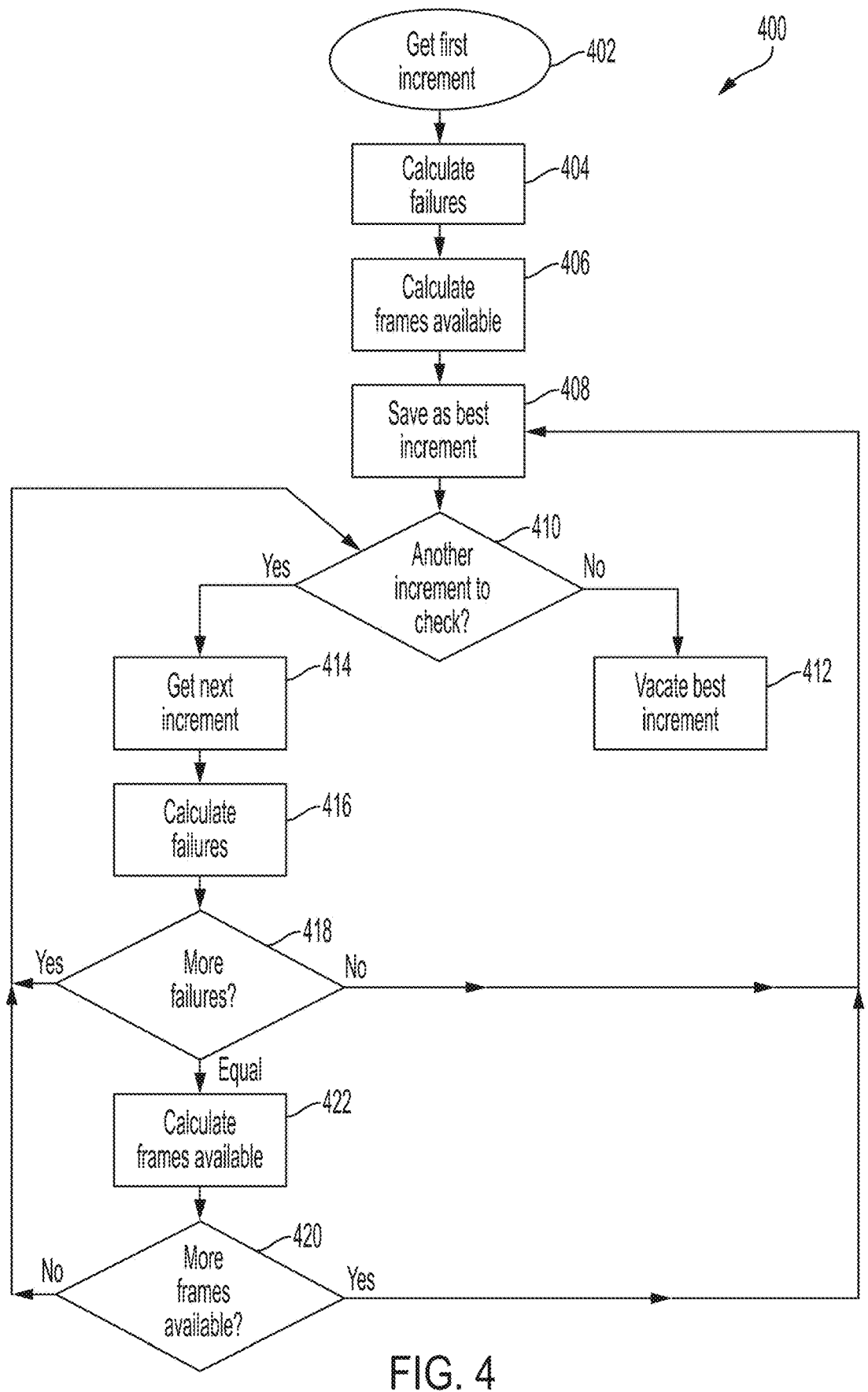
FIG. 4 is a flow diagram of a process for VM memory removal increment selection in accordance with one or more embodiments of the present invention.

In one embodiment, the OSs or application software within each LPAR and partition management firmware 130 contain machine executable instructions that when executed on processors 112 or service processor 118 carry out the operations depicted in the flowchart of FIG. 4 and other operations described herein. Alternatively, the operations performed by one or more embodiments of the present invention can be performed by specific hardware components that contain hardwired logic for performing the steps, or by any combination of programmed computer components and custom hardware components.

One or more embodiments of the present invention may be downloaded as a computer program product, where the program instructions may be transferred from a remote computer such as a server 140 to requesting data processing system 100 by way of data signals embodied in a carrier wave or other propagation medium via a network link 134 (e.g. a modem or network connection) to a communications interface of data processing system 100. The communications interface provides a two-way data communications coupling to network link 134 that may be connected, for example, to a local area network (LAN), wide area network (WAN), directly to an Internet Service Provider (ISP), or to the cloud. In particular, network link 134 may provide wired and/or wireless network communications to one or more networks or clouds.

Network link 134 in turn provides data communication services through network 102. Network 102 may refer to the worldwide collection of networks and gateways (e.g., the Internet or a cloud) that use a particular protocol, such as transmission control protocol (TCP) and Internet protocol (IP), to communicate with one another. Alternatively, network 102 may refer to a local network, a private network, or other networks created for the distribution of information and computing resources, such as a grid computing network. Network link 134 and network 102 both use electrical, electromagnetic, or optical signals that carry digital data streams. The signals through the various networks and the signals on network link 134 and through the communication interface, which carry the digital data to and from data processing system 100, are exemplary forms of carrier waves transporting the information.

In one or more embodiments of the present invention, in addition to server 140 providing a computer program product, server 140 may enable a remote management interface for a system administrator or remote manager to direct dynamic reconfiguration commands (e.g., a reclamation command) to partition management firmware 130 via network 102. In particular, when a system administrator or remote manager chooses to explicitly direct dynamic reconfiguration, partition management firmware 130 receives commands to allocate or deallocate resources to partitions and adjusts the allocation of resources according to the commands.

Figure 2:
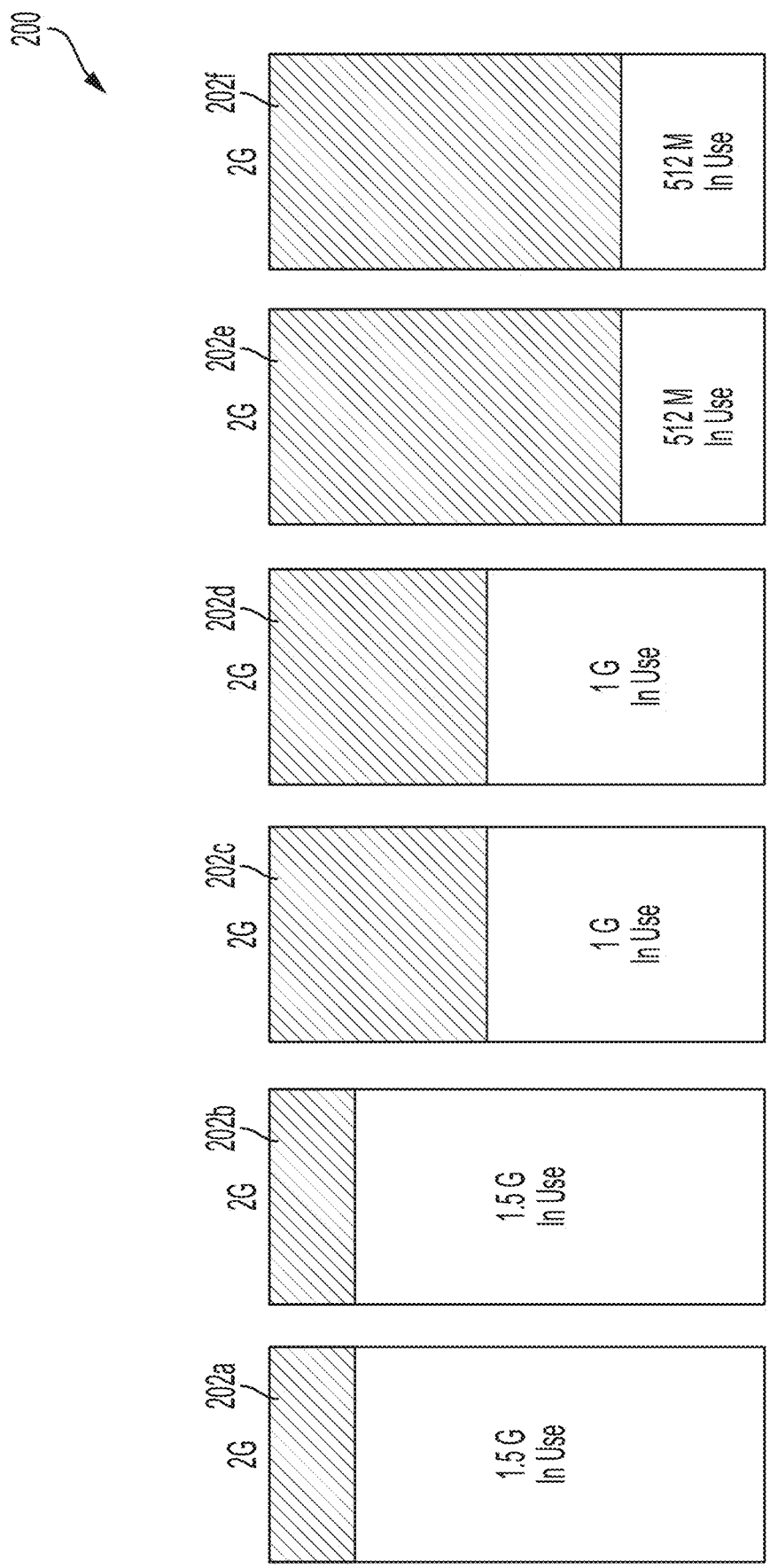
FIG. 2 is a block diagram of memory increments of a virtual machine (VM) in accordance with one or more embodiments of the present invention.

Turning now to FIG. 2, a block diagram 200 of memory increments of a VM is generally shown in accordance with one or more embodiments of the present invention. As shown in FIG. 2, the real memory assigned to the VM is divided up into memory increments. FIG. 2 includes six two gigabyte (2G) memory increments: 202*a*, 202*b*, 202*c*, 202*d*, 202*e*, and 202*f*, referred to collectively herein as memory increments 202. The memory increments 202 represent the total real memory assigned to the VM. Only six memory increments are shown in FIG. 2 for ease of description, however embodiments are not limited to six memory increments, as a typical VM may have hundreds or thousands of assigned memory increments at any given point in time. At the point in time depicted in FIG. 2, memory increments 202*a* and 202*b* each have 1.5Gs in use and 0.5Gs free space; memory increments 202*c* and 202*d* each have 1G in use and 1G free space, and memory increments 202*e* and 202*f* each have 512 megabytes (512M) in use and about 1.5Gs free space. None of the memory increments 202 shown in FIG. 2 have any failures associated with them, and thus their failure counts are all equal to zero. In accordance with one or more embodiments of the present invention, once reclamation starts, the memory increment 202 with the most frames that are not in use will be selected first for a vacating attempt, in this case either memory increment 202*e* or memory increment 202*f*.

Figure 3:
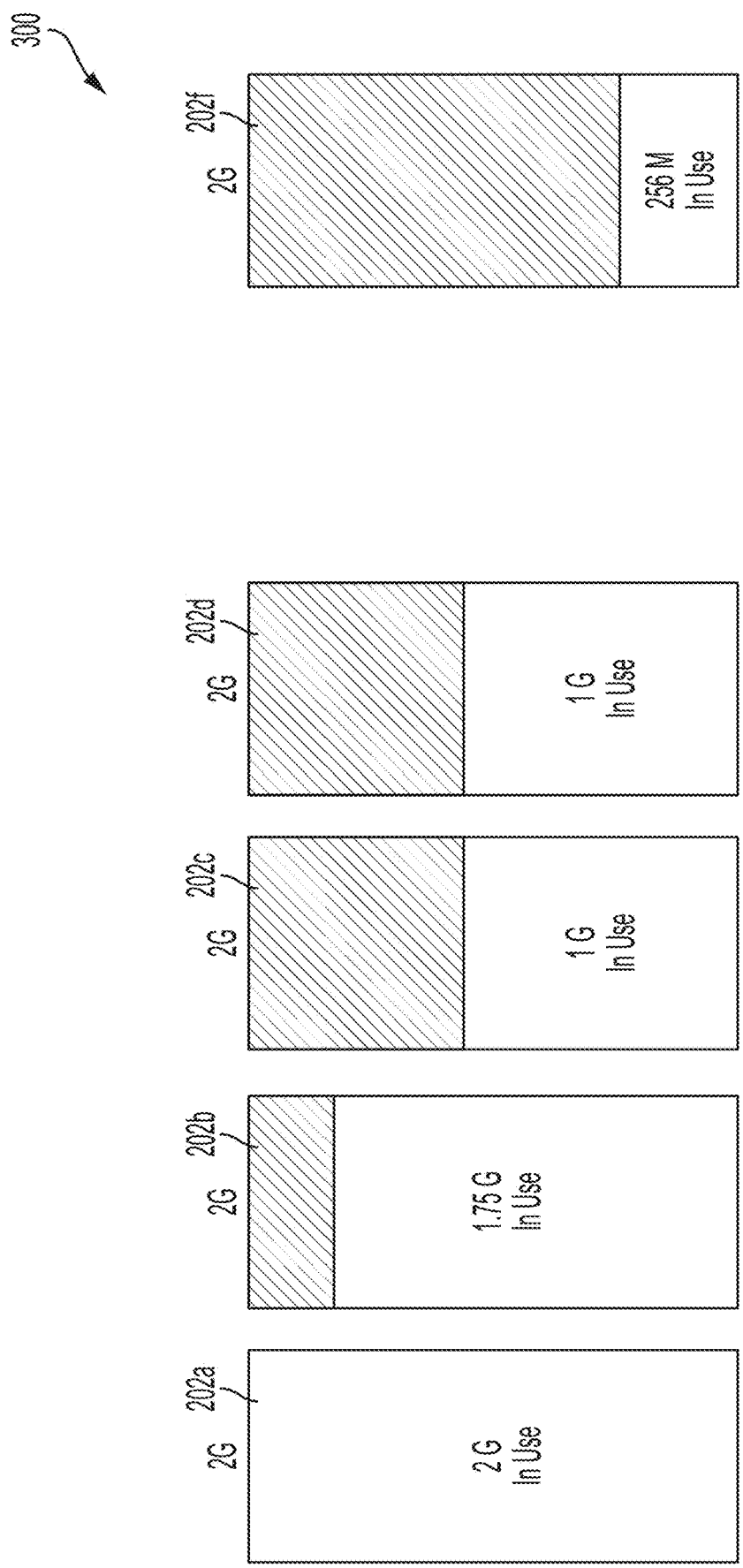
FIG. 3 is a block diagram of the memory increments of FIG. 2 after a memory increment has been reclaimed in accordance with one or more embodiments of the present invention.

Turning now to FIG. 3, a block diagram 300 of memory increments of the VM of FIG. 2 after memory increment 202*e* has been reclaimed is generally shown in accordance with one or more embodiments of the present invention. As shown in FIG. 3, an attempt was made to vacate memory increment 202*f* because it (along with memory increment 202*e*) had the most frames not in use (1.5Gs). As part of the vacate process, an attempt was made to vacate all of contents of memory increment 202*f*. As shown in FIG. 3, only 256Ms of the pages in use could be moved to other memory increments 202, in this example they were moved to memory increment 202b which now has 1.75G in use. The remaining 256Ms of the pages in use in memory increment 202f could not be moved due, for example to pages being locked in memory long term, pages being of types that are prohibited from being moved, or timeouts while attempting to move pages, and a failure count corresponding to memory increment 202f is incremented to indicate that at this point in time portions of the contents of memory increment 202f cannot be vacated.

As shown in the example of FIG. 3, the selection process then selects memory increment 202e and an attempt is made to vacate the 512M of data stored in memory increment 202e. In accordance with one or more embodiments of the present invention, 202e is selected because it has the least failed attempts and it has the most frames available. As shown in FIG. 3, the vacating of all contents of memory increment 202e is successful (the contents are moved to memory increment 202a) and memory increment 202e is reclaimed by the hypervisor for use in other VMs.

It should be noted that content that could not be moved at one point in time may be able to be moved at a different point in time. In addition, the vacate process may use any of a variety of factors to determine a target memory location (e.g., a target memory increment) for content moved from the selected memory increment such as, but not limited to: an amount of free space on the target memory increment and the failure count corresponding to the target memory increment.

Turning now to FIG. 4, a flow diagram 400 of a process for VM memory removal increment selection is generally shown in accordance with one or more embodiments of the present invention. The process shown in FIG. 4 can be performed, for example by partition management firmware executing on a processor. The process shown in FIG. 4 can be initiated by a system operator or system administrator sending a reclamation command to the partition management firmware indicating an amount of memory to be reclaimed from the VM. In accordance with one or more embodiments of the present invention, the reclamation command specifies a number of memory increments to be reclaimed. In accordance with one or more embodiments of the present invention, the processing in blocks 402 through 410 is performed for each of the memory increments assigned to a VM before a "best" memory increment is selected for vacating at block 412. In addition, the failure count for each of the memory increments can be initialized to zero when the memory increment is assigned to the VM.

The processing starts at block 402, with getting information about a first memory increment assigned to the VM. At block 404, the failures for the first memory increment are calculated for example, by accessing a failure count corresponding to the first memory increment. At block 406, the number of frames available on the first memory increment is calculated for example, by accessing a table maintained by the partition management firmware. At block 408, the first memory increment is saved as the best memory increment for vacating.

Still referring to FIG. 4, at block 410 it is determined whether there is another memory increment to check. If there is another memory increment to check, then processing continues at block 414 with getting information about a next memory increment. At block 416 the failures for the next memory increment are calculated. If it is determined at block 418 that the next memory increment has fewer failures (e.g., a lower failure count) than the saved best memory increment, then processing continues at block 408 with saving the next memory increment as the best memory increment for vacating. Processing continues at block 410.

If it is determined at block 418 that the next memory increment has more failures (e.g., has a higher failure count) than the saved best memory increment, then processing continues at block 410.

If it is determined at block 418 that the next memory increment has the same number of failures as the saved best memory increment, then processing continues at block 422 and the number of available frames in the next memory increment is calculated. The number of frames available in the saved best memory increment is compared to the number of frames available in the next memory increment at block 420. If it is determined, at block 420, that the next memory increment has more frames available than the saved best memory increment for vacating, processing continues at block 408 with saving the next memory increment as the best memory increment for vacating. Processing continues at block 410.

If it is determined, at block 420, that the next memory increment does not have more frames available than then saved best memory increment for vacating, then processing continues at block 410.

At block 410, it is determined whether there is another memory increment to check. If there are no more memory increments to check, processing continues at block 412 with attempting to vacate the saved best memory increment. Based on the results of the attempt to vacate the saved best memory increment resulting in not being able to move all of the contents of the saved best memory increment, the failure count associated with the saved best memory increment can be incremented. In accordance with one or more embodiments of the present invention, if the vacating takes longer than an expected amount of time as defined for example by a programmable threshold value, the vacating may time out before all of the content of the saved best memory increment has been moved and the corresponding error count can be incremented.

If all of the contents of the saved best memory increment are successfully moved, then the assignment of the saved best memory increment (also referred to herein as the selected memory increment) to the VM is removed.

On a first time through the processing shown in FIG. 4 for a VM, the failure counts of all of the memory increments will be zero. Over time, as more attempts to vacate memory increments assigned to the VM are performed, the failure counts will become more accurate predictors of whether all of the contents of a memory increment can be vacated. For example, a failure count of one indicates that one attempt to vacate the corresponding memory increment has failed and it may be a temporary condition. However, a failure count of ten may indicate a more permanent condition.

In accordance with one or more embodiments, the memory increments can be selected in any order for the processing described in FIG. 4. In addition, the processing shown in FIG. 4 can be performed for memory increments assigned to a single VM or for memory increments assigned to multiple VMs. In accordance with one or more embodiments of the present invention, the memory increments processed in FIG. 4 are from reconfigurable storage. In accordance with one or more embodiments of the present invention, the memory increments processed in FIG. 4 are from both reconfigurable storage and permanent VM storage.

If a reclamation is issued and the contents of the remaining increments cannot be removed, then the reclamation will need to be halted. This is done either as a timeout by the VM or as a command issued by a system programmer/operator/administrator to stop the reclamation.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
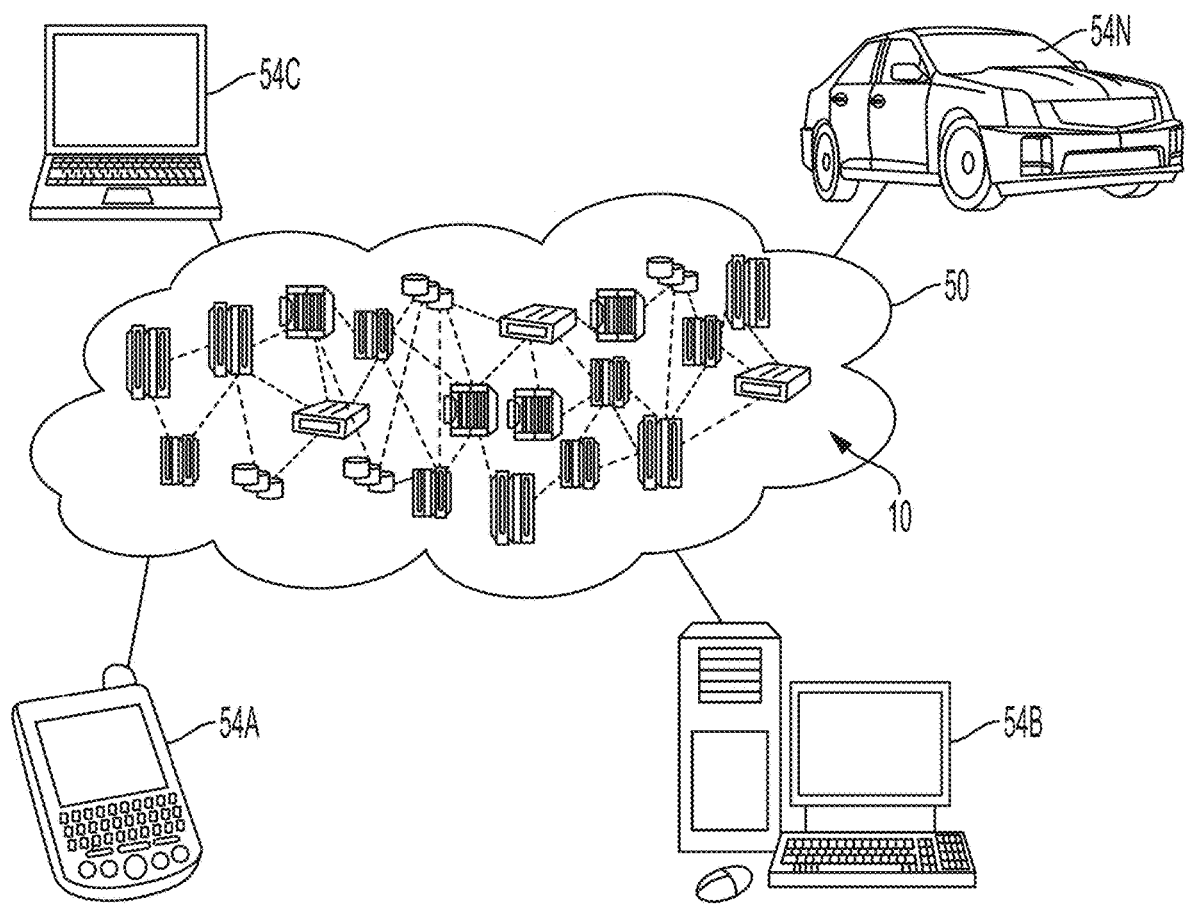
FIG. 5 depicts a cloud computing environment according to one or more embodiments of the present invention.

Referring now to FIG. 5, illustrative cloud computing environment is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
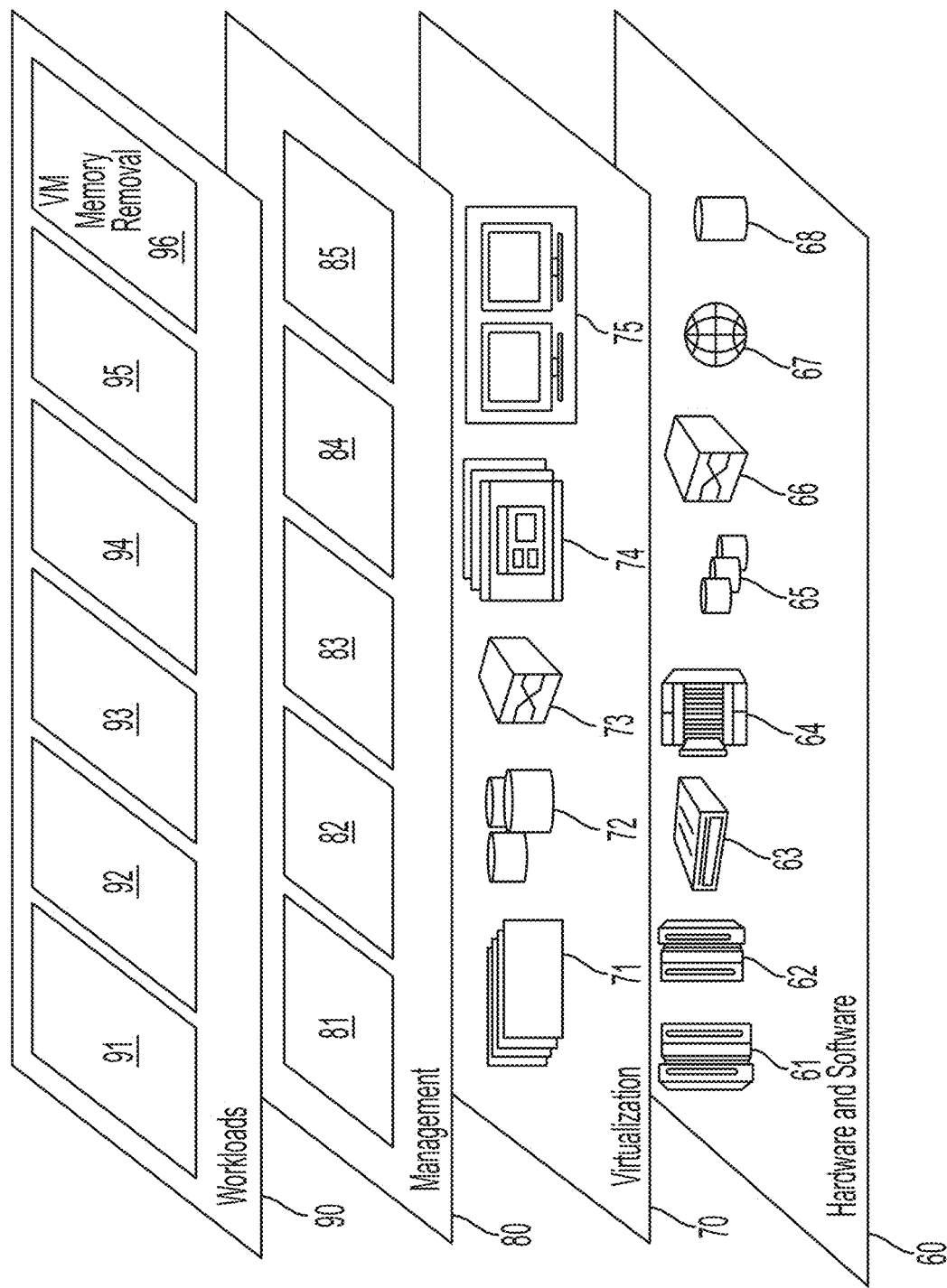
FIG. 6 depicts abstraction model layers according to one or more embodiments of the present invention.

Referring now to FIG. 6 a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 include hardware and software components. Examples of hardware components include: mainframes 61; RISC (Reduced Instruction Set Computer) architecture based servers 62; servers 63; blade servers 64; storage devices 65; and networks and networking components 66. In some embodiments, for example, software components include network application server software 67, database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and VM memory removal 96.

Figure 7:
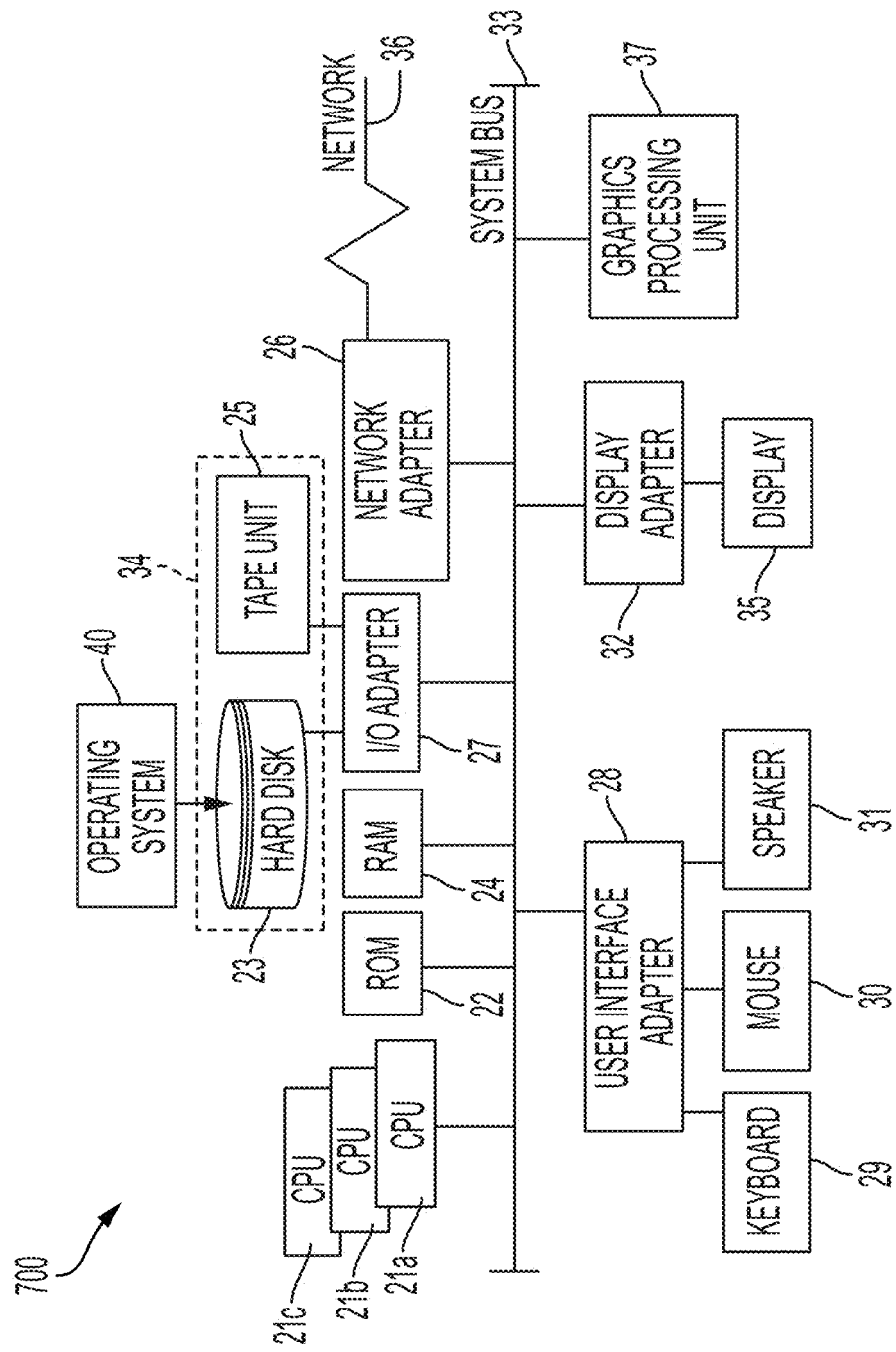
FIG. 7 depicts a processing system for implementing one or more embodiments of the present invention.

It is understood that one or more embodiments of the present invention are capable of being implemented in conjunction with any other type of computing environment now known or later developed. For example, FIG. 7 depicts a block diagram of a processing system 700 for implementing the techniques described herein. The processing system 700 is an example of a computing node 10 of FIG. 5. In the embodiment shown in FIG. 7, processing system 700 has one or more central processing units (processors) 21*a*, 21*b*, 21*c*, etc. (collectively or generically referred to as processor(s) 21 and/or as processing device(s)). According to one or more embodiments of the present invention, each processor 21 can include a reduced instruction set computer (RISC) microprocessor. Processors 21 are coupled to system memory (e.g., random access memory (RAM) 24) and various other components via a system bus 33. Read only memory (ROM) 22 is coupled to system bus 33 and can include a basic input/output system (BIOS), which controls certain basic functions of processing system 700.

Further illustrated are an input/output (I/O) adapter 27 and a communications adapter 26 coupled to system bus 33. I/O adapter 27 can be a small computer system interface (SCSI) adapter that communicates with a hard disk 23 and/or a tape storage drive 25 or any other similar component. I/O adapter 27, hard disk 23, and tape storage device 25 are collectively referred to herein as mass storage 34. Operating system 40 for execution on processing system 700 can be stored in mass storage 34. The RAM 24, ROM 22, and mass storage 34 are examples of memory 19 of the processing system 600. A network adapter 26 interconnects system bus 33 with an outside network 36 enabling the processing system 700 to communicate with other such systems.

A display (e.g., a display monitor) 35 is connected to system bus 33 by display adaptor 32, which can include a graphics adapter to improve the performance of graphics intensive applications and a video controller. According to one or more embodiments of the present invention, adapters 26, 27, and/or 32 can be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 can be interconnected to system bus 33 via user interface adapter 28, which can include, for example, a Super I/O chip integrating multiple device adapters into a single integrated circuit.

According to one or more embodiments of the present invention, processing system 600 includes a graphics processing unit 37. Graphics processing unit 37 is a specialized electronic circuit designed to manipulate and alter memory to accelerate the creation of images in a frame buffer intended for output to a display. In general, graphics processing unit 37 is very efficient at manipulating computer graphics and image processing and has a highly parallel structure that makes it more effective than general-purpose CPUs for algorithms where processing of large blocks of data is done in parallel.

Thus, as configured herein, processing system 700 includes processing capability in the form of processors 21, storage capability including system memory (e.g., RAM 24), and mass storage 34, input means such as keyboard 29 and mouse 30, and output capability including speaker 31 and display 35. According to one or more embodiments of the present invention, a portion of system memory (e.g., RAM 24) and mass storage 34 collectively store an operating system such as the AIX@ operating system from IBM Corporation to coordinate the functions of the various components shown in processing system 700.

In accordance with one or more embodiments of the present invention, all or a subset of the processing described herein is performed by one or more computing node(s) 10 of FIG. 5.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Many of the functional units described in this specification have been labeled as modules. Embodiments of the invention apply to a wide variety of module implementations. For example, a module can be implemented as a hardware circuit including custom VLSI circuits or gate arrays, off-the-shelf semiconductors such as logic chips, transistors, or other discrete components. A module can also be implemented in programmable hardware devices such as field programmable gate arrays, programmable array logic, programmable logic devices or the like. Modules can also be implemented in software for execution by various types of processors. An identified module of executable code can, for instance, include one or more physical or logical blocks of computer instructions which can, for instance, be organized as an object, procedure, or function. Nevertheless, the executables of an identified module need not be physically located together, but can include disparate instructions stored in different locations which, when joined logically together, include the module and achieve the stated purpose for the module.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
 receiving a request to reclaim a portion of a memory assigned to a virtual machine (VM), the memory divided into a plurality of increments, each increment having a corresponding failure count that indicates a number of failures associated with any previous attempts to vacate the increment;
 in response to receiving the request, selecting an increment of the plurality of increments to vacate, the selecting comprising:
  determining whether the request is a first request to reclaim a portion of a memory assigned to the VM;
  in response to determining that the request is a first request to reclaim a portion of a memory assigned to the VM, selecting the increment based on an amount of unused space in each of the plurality of increments; and
  in response to determining that the request is not a first request to reclaim a portion of a memory assigned to the VM, selecting the increment based at least in part on the failure counts corresponding to each of the plurality of increments;
 attempting to vacate all contents of the selected increment;
 based at least in part on determining that all contents of the selected increment were not vacated, incrementing a failure count corresponding to the selected increment, the failure count one of the plurality of failure counts; and based at least in part on determining that all contents of the selected increment were vacated, removing an assignment of the selected increment to the VM.

2. The computer-implemented method of claim 1, wherein vacating the selected increment comprises removing data stored in the increment.

3. The computer-implemented method of claim 1, wherein the failure count corresponding to the selected increment when the request is not a first request is lower than any other failure counts of the plurality of failure counts.

4. The computer-implemented method of claim 1, wherein the selecting the increment in response to determining that the request is not a first request is further based at least in part on an amount of unused space in each of the plurality of increments.

5. The computer-implemented method of claim 1, wherein the failure count corresponding to the selected increment when the request is not a first request is one of a plurality of increments corresponding to a lowest failure count of the plurality of failure counts and the selected increment has more unused space than other increments of the plurality of increments having the lowest failure count.

6. The computer-implemented method of claim 1, wherein the portion is specified as a number of increments.

7. The computer-implemented method of claim 1, wherein the selecting and attempting are repeated until a number of the plurality of increments corresponding to the size of the portion are vacated and their assignment to the VM removed.

8. The computer-implemented method of claim 1, further comprising based at least in part on determining that all contents of the selected increment were not vacated, removing the assignment of the selected increment to the VM.

9. The computer-implemented method of claim 1, wherein all of the contents of the selected increment were not vacated due to a time-out condition.

10. A system comprising:
a memory having computer readable instructions; and
one or more processors for executing the computer readable instructions, the computer readable instructions controlling the one or more processors to perform operations comprising:
receiving a request to reclaim a portion of a memory assigned to a virtual machine (VM), the memory divided into a plurality of increments, each increment having a corresponding failure count that indicates a number of failures associated with any previous attempts to vacate the increment;
in response to receiving the request, selecting an increment of the plurality of increments to vacate, the selecting comprising:
determining whether the request is a first request to reclaim a portion of a memory assigned to the VM;
in response to determining that the request is a first request to reclaim a portion of a memory assigned to the VM, selecting the increment based on an amount of unused space in each of the plurality of increments; and
in response to determining that the request is not a first request to reclaim a portion of a memory assigned to the VM, selecting the increment based at least in part on the failure counts corresponding to each of the plurality of increments;
attempting to vacate all contents of the selected increment;
based at least in part on determining that all contents of the selected increment were not vacated, incrementing a failure count corresponding to the selected increment, the failure count one of the plurality of failure counts; and
based at least in part on determining that all contents of the selected increment were vacated, removing an assignment of the selected increment to the VM.

11. The system of claim 10, wherein vacating the selected increment comprises removing data stored in the increment.

12. The system of claim 10, wherein the failure count corresponding to the selected increment when the request is not a first request is lower than any other failure counts of the plurality of failure counts.

13. The system of claim 10, wherein the selecting the increment in response to determining that the request is not a first request is further based at least in part on an amount of unused space in each of the plurality of increments.

14. The system of claim 10, wherein the failure count corresponding to the selected increment when the request is not a first request is one of a plurality of increments corresponding to a lowest failure count of the plurality of failure counts and the selected increment has more unused space than other increments of the plurality of increments having the lowest failure count.

15. The system of claim 10, wherein the selecting and attempting are repeated until a number of the plurality of increments corresponding to the size of the portion are vacated and their assignment to the VM removed.

16. The system of claim 10, wherein the operations further comprise, based at least in part on determining that all contents of the selected increment were not vacated, removing the assignment of the selected increment to the VM.

17. The system of claim 10, wherein all of the contents of the selected increment were not vacated due to a time-out condition.

18. A computer program product comprising a computer readable storage medium having program instructions embodied therewith, the program instructions executable by a processor to cause the processor to perform operations comprising:
receiving a request to reclaim a portion of a memory assigned to a virtual machine (VM), the memory divided into a plurality of increments, each increment having a corresponding failure count that indicates a number of failures associated with any previous attempts to vacate the increment;
in response to receiving the request, selecting a memory increment of the plurality of memory increments to vacate, the selecting comprising:
determining whether the request is a first request to reclaim a portion of a memory assigned to the VM;
in response to determining that the request is a first request to reclaim a portion of a memory assigned to the VM, selecting the increment based on an amount of unused space in each of the plurality of increments; and
in response to determining that the request is not a first request to reclaim a portion of a memory assigned to the VM, selecting based at least in part on the failure counts corresponding to each of the plurality of memory increments;
attempting to vacate all contents of the selected memory increment;
based at least in part on determining that all contents of the selected memory increment were not vacated, incrementing a failure count corresponding to the selected increment, the failure count one of the plurality of failure counts; and based at least in part on determining that all contents of the selected increment were vacated, removing an assignment of the selected increment to the VM.

19. The computer program product of claim 18, wherein the failure count corresponding to the selected increment when the request is not a first request is lower than any other failure counts of the plurality of failure counts.

20. The computer program product of claim 18, wherein the failure count corresponding to the selected increment when the request is not a first request is one of a plurality of increments corresponding to a lowest failure count of the plurality of failure counts and the selected increment has more unused space than other increments of the plurality of increments having the lowest failure count.

* * * * *